United States Patent
Zhu

(10) Patent No.: US 11,732,156 B2
(45) Date of Patent: Aug. 22, 2023

(54) METHOD FOR ADHERING CURED SILICONES TO LOW ENERGY PLASTICS AND COMPOSITE PREPARED BY THE METHOD

(71) Applicant: Dow Silicones Corporation, Midland, MI (US)

(72) Inventor: Bizhong Zhu, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 999 days.

(21) Appl. No.: 16/497,786

(22) PCT Filed: Mar. 9, 2018

(86) PCT No.: PCT/US2018/021686
§ 371 (c)(1),
(2) Date: Sep. 25, 2019

(87) PCT Pub. No.: WO2018/182950
PCT Pub. Date: Oct. 4, 2018

(65) Prior Publication Data
US 2020/0032119 A1 Jan. 30, 2020

Related U.S. Application Data

(60) Provisional application No. 62/476,956, filed on Mar. 27, 2017.

(51) Int. Cl.
*C09J 183/04* (2006.01)
*C09D 183/14* (2006.01)
(Continued)

(52) U.S. Cl.
CPC ............ *C09D 183/14* (2013.01); *B05D 1/38* (2013.01); *C07F 5/027* (2013.01); *C09J 4/06* (2013.01);
(Continued)

(58) Field of Classification Search
CPC ..... C09D 183/14; C09D 183/04; C07F 5/027; C09J 4/06; C09J 5/02; C09J 2433/003; C09J 2433/008; B05D 3/10
See application file for complete search history.

(56) References Cited

U.S. PATENT DOCUMENTS 6,706,831 B2  3/2004  Sonnenschein et al.
6,777,512 B1  8/2004  Sonnenschein et al.
(Continued)

FOREIGN PATENT DOCUMENTS

WO    WO2014124378 A1 *  8/2014

*Primary Examiner* — Daniel McNally

(57) ABSTRACT

A primer is useful for adhering cured silicones to low energy plastic substrates. The primer is prepared from starting materials including a) an organoboron compound capable of forming a free radical generating species, and at least one of b) an organosilicon compound having, per molecule, at least one free radical reactive group and at least one other reactive group, and/or c) an organoborane liberating compound capable of reacting with starting material a) to liberate the free radical generating species. The method for forming the primer may further include use of d) an organic solvent, and e) a free radical polymerizable monomer, oligomer, macromonomer, or polymer.

18 Claims, 1 Drawing Sheet

(51) Int. Cl.

| | |
|---|---|
| *C07F 5/02* | (2006.01) |
| *C09J 4/06* | (2006.01) |
| *C09J 5/02* | (2006.01) |
| *C09J 133/08* | (2006.01) |
| *C09J 133/12* | (2006.01) |
| *B05D 1/38* | (2006.01) |
| *B05D 5/10* | (2006.01) |
| *B05D 3/10* | (2006.01) |

(52) U.S. Cl.
CPC ............... *C09J 5/02* (2013.01); *C09J 133/08* (2013.01); *C09J 133/12* (2013.01); *C09J 183/04* (2013.01); *B05D 3/10* (2013.01); *B05D 5/10* (2013.01); *C08J 2483/14* (2013.01); *C09J 2433/003* (2013.01); *C09J 2483/003* (2013.01); *C09J 2483/008* (2013.01)

(56) References Cited

U.S. PATENT DOCUMENTS

| | | |
|---|---|---|
| 7,524,907 B2 | 4/2009 | Jialanella et al. |
| 7,683,132 B2 | 3/2010 | Jialanella et al. |
| 8,097,689 B2 | 1/2012 | Ahn et al. |
| 8,304,543 B2 | 11/2012 | Jialanella et al. |
| 9,156,948 B2 | 10/2015 | Brandstadt et al. |
| 9,469,799 B2 | 10/2016 | Cook et al. |
| 9,480,977 B2 | 11/2016 | Brandstadt et al. |
| 2002/0028894 A1* | 3/2002 | Sonnenschein ......... C07F 5/027 526/198 |
| 2005/0137370 A1 | 6/2005 | Jialanella et al. |
| 2009/0111701 A1* | 4/2009 | Ahn ..................... C09D 5/00 506/7 |

\* cited by examiner

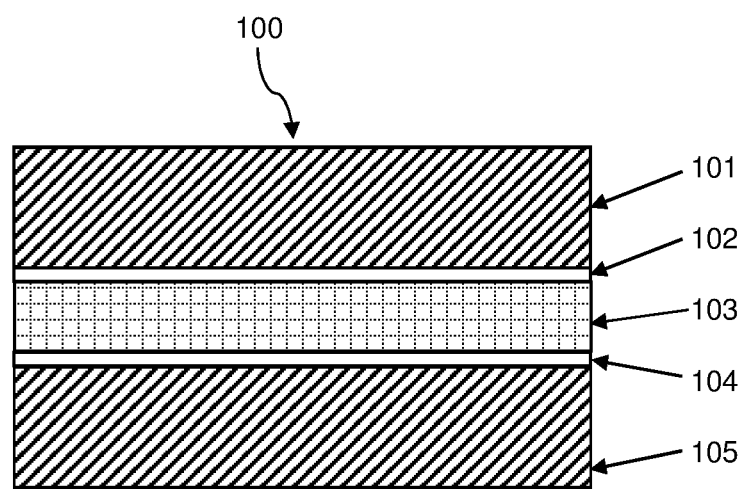

METHOD FOR ADHERING CURED SILICONES TO LOW ENERGY PLASTICS AND COMPOSITE PREPARED BY THE METHOD

CROSS REFERENCE TO RELATED APPLICATIONS

This application claims the benefit of U.S. Provisional Patent Application Ser. No. 62/476,956 filed on 27 Mar. 2017 under 35 U.S.C. § 119(e). U.S. Provisional Patent Application Ser. No. 62/476,956 is hereby incorporated by reference.

TECHNICAL FIELD

A primer including an organoboron compound can be used to adhere silicones to various substrates. A method, and a composite prepared by the method, are disclosed. The method is useful for adhering cured silicones to low energy plastics.

BACKGROUND

The problem of silicone adhesion to low energy plastics such as polyethylene (PE) and polypropylene (PP) has been long recognized. Plasma and corona treatments are the current solutions, which may work for some applications but may be inadequate for others. It is expected that these treatments can result in a Si—O—C type of interfacial bonding, which may be hydrolytically unstable. As a result, there is an industry need to improve adhesion of silicones to low energy plastics. This problem is growing in importance as cheaper, low energy plastics are finding wider uses.

Alkylborane initiated curing for adhesives may provide a new approach to produce strong adhesion to plastics, but previous systems using alkylborane initiated technology necessitated inclusion of high acrylate contents (usually pure acrylates or >40%). At lower acrylate contents, little adhesion to low energy plastics could be achieved. When a silicone adhesive is used, having such a high acrylate (organic) content in the silicone adhesive may compromise the silicone characteristics such that little commercial value can be realized.

SUMMARY

A method for priming a substrate and adhering a cured silicone thereto, and a composite formed using the method, are described herein. The method comprises:

1) applying to a surface of a substrate, a primer composition comprising a) an organoboron compound capable of forming a free radical generating species, and 2) contacting a curable silicone composition with the surface of the substrate, where the primer composition and/or the curable silicone composition comprises at least one of b) an organosilicon compound having, per molecule, at least one free radical reactive group and at least one other reactive group, and/or c) an organoborane liberating compound capable of reacting with starting material a) to liberate the free radical generating species. In this method, starting material c) is used in the method when either:

starting material b) is absent or starting material b) does not contain a group capable of reacting with starting material a) to liberate the free radical generating species.

BRIEF DESCRIPTION OF THE DRAWINGS

FIG. 1 shows a partial cross section of a composite 100 prepared by the method described herein.

DETAILED DESCRIPTION

In the method described above, the primer composition comprises:

a) an organoboron compound capable of forming a free radical generating species. The free radical generating species is formed when starting material a) reacts with at least one of:

b) an organosilicon compound having, per molecule, at least one free radical reactive group and at least one other reactive group and/or c) an organoborane liberating compound capable of reacting with starting material a) to liberate the free radical generating species. Starting material b) may have a group capable of reacting with starting material a) to liberate the free radical generating species. When starting material b) has a group capable of reacting with starting material a) to liberate the free radical generating species, then starting material c) is not required, however, in this embodiment, starting material c) may be used in the method. When starting material b) does not have a has a group capable of reacting with starting material a) to liberate the free radical generating species, then starting material c) is used in the method. Starting material b) and starting material c) are distinct from one another.

In one embodiment, the primer composition comprises starting material a) and at least one of starting material b) and/or starting material c). In this embodiment, the primer composition may optionally further comprise one or more additional starting materials selected from the group consisting of: d) an organic solvent; e) a free radical polymerizable monomer, oligomer, macromonomer, or polymer; f) a crosslinker; g) an adhesion promoter; h) a wetting agent; i) a corrosion inhibitor; j) a moisture scavenger; and k) a free radical cure accelerator.

The primer composition may be a multiple part composition, wherein starting material a) is stored in a separate part from any starting material capable of reacting with starting material a) to liberate the free radical generating species, i.e., starting material b), when starting material b) has a group capable of liberating the free radical generating species, and/or starting material c), when used in the method. The multiple part composition comprises Part A, comprising all or a portion of starting material a); and Part B, comprising all or a portion of starting material b) and/or starting material c). Part A may not contain starting material c) (and starting material b) in the embodiment where starting material b) has a group capable of liberating the free radical generating species). Part B may not contain starting material a) in order to keep starting materials a) and c) separate before use of the primer composition. When Part B includes starting material b) in the embodiment where starting material b) has a group reactive with starting material a) to liberate the free radical generating species, Part A may not contain starting material b). When starting material b) contains a group capable of reacting with starting material a) to liberate the free radical generating species, starting material c) is optional. The multiple part composition may optionally further comprise a separate additional part, i.e., when the multiple part composition contains more than two parts. The additional part may comprise a portion of starting material a) or a portion of starting material b) and/or starting material c). When the multiple part composition has two parts and further comprises starting material c) the organoborane liberating compound, starting material c) is in Part B. In one embodiment, step 1) of the method comprises applying Part A to the substrate and thereafter applying Part B to the substrate after Part A. In an alternative embodiment, step 1) of the method comprises applying Part B to the substrate and thereafter applying Part A to the substrate after Part B.

The primer composition described above comprises a) the organoboron compound capable of forming free radical generating species. Starting material a) may be selected from the group consisting of: i) an organoborane—organonitrogen compound complex, ii) an organoborate containing at least one B—C bond, and iii) both i) the organoborane—organonitrogen compound complex and ii) the organoborate containing at least one B—C bond. The organoboron compound may be air stable. The organoborane—organonitrogen compound complex may be an organoborane—amine complex, such as those disclosed in U.S. Pat. Nos. 6,706,831 and 8,097,689 at col. 10, line 39-col. 12, line 35.

The organoborane—organonitrogen compound complex may have formula

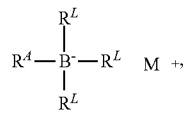

where subscript xx is 1 or more, subscript yy is 1 or more, each $R^L$ is independently an alkyl group of 1 to 12 carbon atoms, a cycloalkyl group of 3 to 12 carbon atoms, an alkylaryl group, an organosilane group such as an alkylsilane group or an arylsilane group, an organosiloxane group such as alkyl siloxane or arylsiloxane; and each $R^A$ is a primary amine-functional compound, a secondary amine-functional compound, or an amide-functional compound. Each $R^L$ is covalently bonded to the boron atom, and $R^A$ forms a complex with boron. (The arrow in the formula represents a coordination, not a covalent bond.) Alkyl groups and cycloalkyl groups suitable for $R^L$ are defined hereinbelow. Suitable alkyl groups include ethyl, propyl and butyl. Suitable compounds for $R^A$ include hydrocarbylene diamines such as 1,3-propylene diamine and isophorone diamine; alkoxyalkyl amines such as 3-methoxypropyl amine; aminofunctional alkoxysilanes such as 3-aminopropyltriethoxysilane. Alternatively, each subscript xx is 1 and each subscript yy is 1. Alternatively each subscript xx is 1.3 and each subscript yy is 1.

The organoborane—organonitrogen compound complex may be selected from the group consisting of i) tri-n-butyl borane complex with isophorone diamine; ii) tri-n-butyl borane complex with 1,3-propylene diamine; iii) tri-n-butyl borane complex with 3-methoxypropyl amine; iv) triethylborane complex with 1,3-propylene diamine; v) triethylborane complex with isophorone diamine; vi) triethylborane complex with 3-methoxypropyl amine; vii) tri-isobutyl borane complex with isophorone diamine; viii) tri-isobutyl borane complex with 1,3-propylene diamine; ix) tri-isobutyl borane complex with 3-methoxypropylamine; x) tri-n-butylborane complex with 3-aminopropyltriethoxysilane; xi) tri-n-butylborane complex with 3-aminopropyltrimethoxysilane; xii) triethylborane complex with 3-aminopropyltriethoxysilane; xiii) triethylborane complex with 3-aminopropyltrimethoxysilane, and a combination of two or more of i), ii), iii), iv), v), vi), vii), viii), ix), x), xi), xii), and xiii).

The organoborate containing at least one B—C bond can be an amido-borate. The amido-borate may have formula

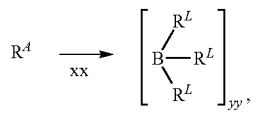

where $R^A$ and $R^L$ are as described above, $R^A$ is bonded to the boron atom via a covalent bond or an ionic bond, and M is a cation. M may be a metal ion or a quaternary ammonium ion. Exemplary amido-borates are exemplified by those disclosed, for example, in U.S. Pat. No. 7,524,907 at col. 6, line 50 to col. 10, line 67; U.S. Pat. No. 7,683,132 at col. 3, line 3 to col. 12, line 54.

Starting material a) is present in the primer composition. Alternatively, a portion of starting material a) is present in Part A when the primer composition has multiple parts, and another portion of starting material a) is present in a separate additional part, when the multiple part composition has more than two parts. The amount of starting material a) may be 0.01 to 65, alternatively 0.1 to 30, alternatively 0.5 to 20, alternatively 1 to 10 parts by weight per 100 parts of combined weights of all starting materials in the primer composition.

Starting material b) may be added to the primer composition, the curable silicone composition, or both. When starting material b) is added to the curable silicone composition, starting material b) may be in the curable silicone composition (e.g., mixed with the other starting materials of the curable silicone composition) and/or on a surface of the curable silicone composition (e.g., coated on a surface of the curable silicone composition that will contact the surface of the substrate having starting material a) thereon). The organosilicon compound for starting material b) may comprise a silane of formula $R^1_m R_n SiX_{(4-m-n)}$, where each R is independently a monovalent hydrocarbon group of 1 to 18 carbon atoms, each $R^1$ independently represents a methacryl-functional alkyl group or an acryl-functional alkyl group, each X is independently a hydrolyzable group, hydrogen, or vinyl, subscript m is 1 to 2, subscript n is 0 to 2, and a quantity (m+n) is 2 to 3. Alternatively, the organosilicon compound for starting material b) may comprise a polyorganosiloxane of unit formula:
$(X_c R_{3-c} SiO_{1/2})_o (R^1 R_2 SiO_{1/2})_p (R_2 SiO_{2/2})_q (RXSiO_{2/2})_r$
$(R^1 RSiO_{2/2})_s (R^1 SiO_{3/2})_w (RSiO_{3/2})_t (SiO_{4/2})_u$, where R, $R^1$, and X, are as described above, subscript c is 1 to 3, subscript o≥0, subscript p≥0, subscript q≥0, subscript r≥0, subscript s≥0, subscript w≥0, subscript t≥0, and subscript u≥0, with the provisos that a quantity (o+r)≥1, a quantity (p+s+w)≥1, and a quantity (o+p+q+r+s+w+t+u)>2.

Each R is independently a monovalent hydrocarbon group of 1 to 18 carbon atoms. Suitable groups for R include, but are not limited to, alkyl and aryl groups, as defined hereinbelow. Suitable alkyl groups are exemplified by methyl, ethyl, propyl, butyl and hexyl. Suitable aryl groups are exemplified by phenyl, tolyl, xylyl, and phenyl-methyl.

Each $R^1$ independently represents a methacryl-functional alkyl group or an acryl-functional alkyl group. Suitable groups for $R^1$ include methylmethacrylate, methyl acrylate, butyl methacrylate, 2-ethylhexylacrylate, and 2-ethylhexylmethacrylate.

Each X independently represents a silicone reactive group. X can be a hydrolyzable group selected from an acetamido group, an acyloxy group such as acetoxy, an alkoxy group, an amido group, an amino group, an aminoxy group, an oximo group, a ketoximo group, and a methylacetamido group. X is not a hydroxyl group. Alternatively, each X may be an acetoxy group or an alkoxy group. Alternatively, each X is an alkoxy group, such as methoxy, ethoxy, propoxy or butoxy; alternatively methoxy. Alternatively, X can be hydrogen, or an aliphatically unsaturated hydrocarbon group. Suitable aliphatically unsaturated hydrocarbon groups include alkenyl groups such as vinyl, allyl, and hexenyl; and alkynyl groups such as ethynyl and propynyl.

In the unit formula above, subscript o≥0, subscript p≥0, subscript q≥0, subscript r≥0, subscript s≥0, subscript w≥0, subscript t≥0, and subscript u≥0, with the provisos that a quantity (o+r)≥1, a quantity (p+s+w)≥1, and a quantity (o+p+q+r+s+w+t+u)>2. Alternatively, subscript o is 0 to 100, alternatively 0 to 50, alternatively 0 to 20, alternatively 0 to 10, alternatively, 1 to 50, alternatively, 1 to 20, and alternatively 1 to 10. Alternatively, subscript p may be 0 to 100, alternatively 0 to 50, alternatively 0 to 20, alternatively 0 to 10, alternatively 1 to 50, alternatively 1 to 20, and alternatively 1 to 10. Alternatively, subscript q is 0 to 1,000, alternatively 0 to 500, alternatively 0 to 200, alternatively 0 to 100, alternatively 1 to 500, alternatively 1 to 200, and alternatively 1 to 100. Alternatively, subscript r is 0 to 100, alternatively 0 to 50, alternatively 0 to 20; alternatively 0 to 10, alternatively 1 to 50, alternatively 1 to 20, and alternatively 1 to 10. Alternatively, subscript s is 0 to 100, alternatively 0 to 50, alternatively 0 to 20, alternatively 0 to 10, alternatively 1 to 50, alternatively 1 to 20, and alternatively 1 to 10. Alternatively, subscript w is 0 to 100, alternatively 0 to 50, alternatively 0 to 20, alternatively 0 to 10, alternatively 1 to 50, alternatively 1 to 20, and alternatively 1 to 10. Alternatively, subscript t is 0 to 1,000, alternatively 0 to 500, alternatively 0 to 200; alternatively 0 to 100, alternatively 1 to 500, alternatively 1 to 200, and alternatively 1 to 100. Alternatively, subscript u is 0 to 1,000, alternatively 0 to 500, alternatively 0 to 200, alternatively 0 to 100, alternatively 1 to 500, alternatively 1 to 200, and alternatively 1 to 100.

Examples of starting material b) include silanes, such as methacryloxypropyltrimethoxysilane, acryloxypropyltrimethoxysilane, acryloxypropyltriethoxysilane, methacryloxypropyltriethoxysilane, methacryloxypropylmethyldimethoxysilane, acryloxypropylmethyldimethoxysilane, acryloxypropyldimethylmethoxysilane, and methacryloxypropyldimethylmethoxysilane. Other suitable organosilicon compounds for starting material b), which can react with starting material a) to liberate the organoboron free radical species include i) an acyloxysilane, ii) an acyloxysiloxane, iii) a carboxylic acid functional silane, iv) a carboxylic acid functional siloxane, v) an anhydride functional silane, vi) an anhydride functional siloxane, vii) an epoxy functional silane, vii) an epoxy functional siloxane, or a combination of two or more thereof.

When starting material b) is used in the method, the exact amount depends on various factors including the selection of the other starting materials, whether any additional starting materials are added, whether starting material b) contains a group capable of reacting with starting material a) to liberate the free radical generating species, and whether starting material b) is added to the primer composition or the curable silicone composition, both, and the curable silicone composition selected. However, starting material b) may be present in an amount ranging from 0.01% to 25% based on combined weights of all starting materials in the primer composition. Alternatively, starting material b) is present in an amount of 0.1% to 25%, alternatively 0.1% to 15%, alternatively 0.5% to 15%, alternatively 0.5% to 10%, alternatively 0.1% to 5%, based on combined weights of all starting materials in the primer composition.

In the method described above, starting material c), an organoborane liberating compound may optionally be added to the primer composition to react with starting material a), for example, when starting material b) does not sufficiently react with starting material a) to release the free radical generating species. Starting material c) may be added to the primer composition and/or to the curable silicone composition (as described above for starting material b)).

Organoborane liberating compounds suitable for use as starting material c) in method described herein include the amine reactive compounds disclosed, for example, in U.S. Pat. No. 8,097,689 at col. 12, line 55-col. 13, line 46. The term "organoborane liberating compound" means a compound that will at least partially react with starting material a) and release another organoboron compound that contains at least one B—C bond that can be readily oxidized and generate free radical. The organoborane liberating compound may be selected from: i) an acid, ii) an aldehyde, iii) an isocyanate, iv) an epoxide, v) an acid chloride, vi) an anhydride, vii) a halosilane, viii) a halosiloxane, ix) a sulphonyl chloride, and a combination of two or more of i), ii), iii), iv), v), vi), vii), viii), and ix). Alternatively, the liberating compound may be selected from, methacrylic acid, acetic acid, isophorone diisocyanate, or a combination thereof. Starting material c) can be present in amount from 0 to 60 parts, alternatively from 0.1 to 60 parts, alternatively from 0.1 to 40 parts, alternatively from 0.1 to 30 parts, alternatively from 0.5 to 30 parts, alternatively from 0.5 to 20 parts based on combined weights of all starting materials in the primer composition.

Starting material d) is an organic solvent that may optionally be added to the primer composition. Alternatively, a portion of starting material d) is present in Part A when the primer composition has multiple parts, and another portion of starting material d) is present in Part B, and/or in the separate additional part, when the multiple part composition has more than two parts. Starting material d) in the primer composition is a solvent that does not react with the organoboron compound. Starting material d) may be selected from (i) a hydrocarbon, (ii) an ester, (iii) an ether, (iv) a ketone, and (v) a combination of two or more of (i), (ii), (iii), and (iv). Starting material d) may be a hydrocarbon. Suitable hydrocarbons for use in the primer composition and method include alkanes such as hexane, cyclohexane, heptane, octane, decane, dodecane, and/or isododecane; and aromatic hydrocarbons such as benzene, toluene, xylene, and/or mesitylene; or mixtures of both alkanes and aromatic hydrocarbons. Alternatively, esters such as ethyl acetate may be used. Alternatively, ketones such as acetone may be used. The amount of starting material d) may be 0.0 to 95, alternatively 0.1 to 80, alternatively 0.5 to 60, alternatively 10 to 50 part by weight per 100 parts of combined weights of all starting materials in the primer composition.

In the method described herein, a solution comprising starting material a) and starting material d) may be applied to the substrate in step 1). All or a portion of starting material d) may then be removed before step 2) and/or before applying Part B of a multiple part composition to the substrate. Alternatively, Part B of the multiple part composition may further comprise starting material d) in addition to starting material b) and/or starting material c), and Part B may be applied to the substrate, all or a portion of starting material d) may be removed, and thereafter Party A may be applied to the substrate in step 1).

Starting material e) is a free radical polymerizable monomer, oligomer, macromonomer, or a polymer, and is optional in the primer composition. Starting material e) is a free radical polymerizable monomer, oligomer, macromonomer or polymer.

The radical polymerizable monomer may be a (meth)acrylate monomer. The (meth)acrylate monomer is exemplified by (i) methylacrylate, (ii) butylacrylate, (iii) 2-ethylhexylacrylate, (iv) isobornyl acrylate, (v) terahydrofurfuryl acrylate, (vi) cyclohexylmethylacrylate, (vii) methyl methacrylate (MMA), (viii) butyl methacrylate, (ix) 2-ethylhexylmethacrylate, (x) isobornyl methacrylate, (xi) terahydrofurfuryl methacrylate, (xii) cyclohexylmethylmethacrylate, and (xiii) amino-methacrylates such as dimethylaminoethyl methacrylate, (xiv) tert-butylmethacrylate, (xv) ethylacrylate, (xvi) hydroxyethylmethacrylate, (xvii) glycidyl methacrylate, (xviii) n-methacrylamide, n-propylacrylate, hexyl acrylate and methacrylate, octyl acrylate and methacrylate, hydroxyethyl acrylate and methacrylate, hydroxyhexyl acrylate and (xix) mixtures of two or more of (i), (ii), (iii), (iv), (v), (vi), (vii), (viii), (ix), (x), (xi), (xii), (xiii), (xiv), (xv), (xvi), (xvii), and (xviii). The free radical polymerizable monomer may be present in an amount of 0.1% to 75%, alternatively 0.1% to 45%, alternatively 0.1 to 25%, and alternatively 0.1% to 10%, based on combined weights of all starting materials in the primer composition.

Other free radical polymerizable monomers, oligomers, macromonomers, and copolymers are exemplified by unsaturated hydrocarbons (e.g., ethylene, propylene, butylene, isobutylene, 1-octene, 1-dodecane, 1-heptadecane, 1-eicosene), vinyl compounds (such as styrene, vinyl pyridine, 5-methyl-2-vinyl pyridine, vinyl naphthalene, alpha-methylstyrene, vinyl and vinylidene halides, acrylonitrile, methacrylonitrile, vinyl acetate and vinyl propionate, vinyl oxyethanol, vinyl trimethylacetate, vinyl hexonate, vinyl laurate, vinyl chloroacetate, vinyl stearate, methyl vinyl ketone, vinyl isobutyl ether, vinyl ethyl ether, butadiene, 2-chlorobutadiene, isoprene), ethylenically unsaturated compounds are selected from class consisting of acrylamide, acrylic acid, methacrylic acid, diethylaminoethyl methacrylate, dimethylaminoethyl methacrylate, dimethylaminoethyl acrylate, maleate or fumarate polyester, butadiene, styrene, methyl methacrylate, acrylonitrile, vinyl acetate and vinylidene chloride); and acrylate tipped polyurethane prepolymers available commercially from several sources and prepared by reacting an isocyanate reactive acrylate monomer, oligomer or polymer, such as a hydroxy acrylate with an isocyanate functional prepolymer. Alternatively, free radical polymerizable polymers such as polymethylmethacrylate may be used as starting material e).

Starting material f) is a crosslinker. The crosslinker may comprise a multifunctional (meth)acrylate crosslinker, such as a di(meth)acrylate. Such crosslinkers are exemplified by ethylene glycol dimethacrylate, ethylene glycol diacrylate, triethylene glycol dimethacrylate, diethylene glycol bis-methacryloxy carbonate, polyethylene glycol diacrylate, tetraethylene glycol dimethacrylate, diglycerol diacrylate, diethylene glycol dimethacrylate, pentaerythritol triacrylate, trimethylolpropane triglycidyl ether, trimethylolpropane tris (2-methyl-1-aziridine)propionate, trimethylol propane trimethacrylate, acrylate tipped urethane containing prepolymers, polyether diacrylates, and dimethacrylates, and combinations of two or more thereof. Suitable multifunctional (meth)acrylate crosslinkers are disclosed, for example, in U.S. Pat. No. 8,304,543 at col. 11 lines 46-65.

Alternatively, the crosslinker may be a silicon containing crosslinker, such as a silane or siloxane having an average, per molecule of more than two functional substituents selected from silicon bonded hydrogen atoms, hydrolyzable groups, and aliphatically unsaturated groups. Examples of suitable silane crosslinkers for starting material f) may have the general formula $R^2_{ii}SiX_{(4-ii)}$, where X is as described above; each $R^2$ is independently a monovalent hydrocarbon group such as an alkyl group; and subscript ii has an average value less than 2. Alternatively, each X may be, for example, a hydrogen atom, a halogen atom, an acetamido group, an acyloxy group such as acetoxy, an alkoxy group, an amido group, an amino group, an aminoxy group, a hydroxyl group, an oximo group, a ketoximo group, a methylacetamido group, an alkenyl group, or alkynyl group. Alternatively, subscript ii may be 0 or 1. Alternatively, each X may be independently selected from hydroxyl, alkoxy, acetoxy, amide, oxime or alkenyl such as vinyl allyl or hexenyl. Alternatively, the silane crosslinker may be selected from an acyloxysilane, an alkoxysilane, a ketoximosilane, and an oximosilane.

The silane crosslinker may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane. Alternatively, the silane crosslinker may comprise an acyloxysilane, such as an acetoxysilane. Acetoxysilanes include a tetraacetoxysilane, an organotriacetoxysilane, a diorganodiacetoxysilane, or a combination thereof. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. Alternatively, starting material f) may comprise organotriacetoxysilanes, for example mixtures comprising methyltriacetoxysilane and ethyltriacetoxysilane. Examples of silanes suitable for starting material f) containing both alkoxy and acetoxy groups that may be used in the primer composition include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof. Examples of suitable silane crosslinkers are disclosed in U.S. Pat. Nos. 9,156,948 and 9,480,977.

Alternatively, the crosslinker for starting material f) may comprise a polyorganosiloxane of unit formula: $(X_cR_{3-c}SiO_{1/2})_{oo}(R^1R_2SiO_{1/2})_{pp}(R_2SiO_{2/2})_{qq}(RXSiO_{2/2})_{rr}(R^1RSiO_{2/2})_{ss}(R^1SiO_{3/2})_{ww}(RSiO_{3/2})_{tt}(SiO_{4/2})_{uu}$, where R, $R^1$, and X and subscript c are as described above, subscript oo≥0, subscript pp≥0, subscript qq≥0, subscript rr≥0, subscript ss≥0, subscript ww≥0, subscript ty≥0, and subscript uu≥0, with the provisos that a quantity (oo+rr)>2, a quantity (pp+ss+ww)≥0, and a quantity (oo+pp+qq+rr+ss+ww+tt+uu)>2, and the quantity (oo+pp+qq+rr+ss+ww+tt+uu)<50.

The primer composition described above may optionally further comprise starting material g), an adhesion promoter. Suitable adhesion promoters may comprise a transition metal chelate, a hydrocarbonoxysilane such as an alkoxysilane, a combination of an alkoxysilane and a hydroxy-functional polyorganosiloxane, an aminofunctional silane, a mercaptoalkylsilane, an epoxyalkylsilane, acrylate function silane, or a combination thereof. Adhesion promoters are known in the art and may comprise silanes having the formula $R^4_{jj}R^5_{kk}Si(OR^6)_{4-(jj+kk)}$ where each $R^4$ is independently a monovalent organic group having at least 3 carbon atoms; $R^5$ contains at least one SiC bonded substituent having an adhesion-promoting group, such as amino, epoxy, mercapto or acrylate groups; each $R^6$ is independently a saturated hydrocarbon group such as an alkyl group of 1 to 4 carbon atoms; subscript jj has a value ranging from 0 to 2; subscript kk is either 1 or 2; and a quantity (jj+kk) is not greater than 3. Alternatively, the adhesion promoter may comprise a partial condensate of the above silane. Alternatively, the adhesion promoter may comprise a combination of an alkoxysilane and a hydroxy-functional polyorganosiloxane.

Alternatively, the adhesion promoter may comprise an unsaturated or epoxy-functional compound. The adhesion promoter may comprise an unsaturated or epoxy-functional alkoxysilane. For example, the functional alkoxysilane can have the formula $R^7_{mm}Si(OR^8)_{(4-mm)}$, where subscript mm is 1, 2, or 3, alternatively subscript mm is 1. Each $R^7$ is independently a monovalent organic group with the proviso that at least one $R^7$ is an unsaturated organic group or an epoxy-functional organic group. Epoxy-functional organic groups for $R^7$ are exemplified by 3-glycidoxypropyl and (epoxycyclohexyl)ethyl. Unsaturated organic groups for $R^7$ are exemplified by 3-methacryloyloxypropyl, 3-acryloyloxypropyl, and unsaturated monovalent hydrocarbon groups such as vinyl, allyl, hexenyl, undecylenyl. Each $R^8$ is independently a saturated hydrocarbon group of 1 to 4 carbon atoms, alternatively 1 to 2 carbon atoms. $R^8$ is exemplified by methyl, ethyl, propyl, and butyl.

Examples of suitable epoxy-functional alkoxysilanes include 3-g lycidoxypropyltrimethoxysilane, 3-g lycidoxypropyltriethoxysilane, (epoxycyclohexyl)ethyldimethoxysilane, (epoxycyclohexyl)ethyldiethoxysilane, (epoxycyclohexyl)ethyltrimethoxysilane, (epoxycyclohexyl)ethyltriethoxysilane, and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Alternatively, the adhesion promoter may comprise a transition metal chelate. Suitable transition metal chelates include titanates, zirconates such as zirconium acetylacetonate, aluminum chelates such as aluminum acetylacetonate, and combinations thereof.

Alternatively, the adhesion promoter may comprise a triazine based compound that bears functionality to react with the curable silicone composition and/or the other starting materials in the primer composition. The triazine ring can be mono-, di-, or tri-substituted and at least one of the substitute group is the functionality to react. The functionality can be a free radical reactive one or a condensation reactive one. Examples of triazine compound with free radical reactive functional groups include triallylisocyanurate, diallylpropylisocyanurate, tri-(methacryloxypropyl) isocyanurate, triallyloxytriazine, trimethacryloxytriazine, triacryloylhexahydrotriazine, and tris[2-(acryloyloxy)ethyl] isocyanurate. Examples of triazine compound with condensation reactive group include 2,4,6-tris(methyldimethoxysilyl)triazine, and tris[3-(trimethoxysilyl)propyl] isocyanurate.

The exact amount of adhesion promoter depends on various factors including the type of adhesion promoter selected and the materials of construction of the substrate. However, the adhesion promoter, when present, may be added to the primer composition in an amount of 0.01 to 50 weight parts based on combined weight of all starting materials in the primer composition, alternatively 0.01 to 10 weight parts, and alternatively 0.01 to 5 weight parts. Examples of suitable adhesion promoters are described in U.S. Pat. No. 9,156,948.

Starting material h) a wetting agent may optionally be added to the primer composition. The wetting agent may be a surfactant, such as an anionic surfactant, e.g., dodecylbenzensulfonic acid sodium salt; a cationic surfactant, e.g., cetyltrimethylammonium chloride; and/or a nonionic surfactant, e.g. polyvinylalcohol, or a silicone polyether. The exact amount of wetting agent depends on various factors including the type of substrate on which the primer composition will be applied and the other starting materials in the primer composition. However, the wetting agent, when present may be added to the primer composition in an amount of 0 to 10 weight parts, alternatively 0.01 to 5 parts, based on combined weight of all starting materials in the primer composition.

The primer composition may optionally further comprise starting material i), a corrosion inhibitor. Examples of suitable corrosion inhibitors include benzotriazole, mercaptabenzotriazole and commercially available corrosion inhibitors such as 2,5-dimercapto-1,3,4-thiadiazole derivative (CUVAN® 826) and alkylthiadiazole (CUVAN® 484) from R. T. Vanderbilt of Norwalk, Conn., U.S.A. When present, the amount of corrosion inhibitor may be 0.05% to 0.5% based on combined weights of all starting materials in the primer composition.

The primer composition may optionally further comprise starting material j) a moisture scavenger. The moisture scavenger binds water from various sources. For example, the moisture scavenger may bind by-products of condensation reaction, such as water and alcohols.

Examples of suitable adsorbents for the drying may be inorganic particulates. The adsorbent may have a particle size of 10 micrometers or less, alternatively 5 micrometers or less. The adsorbent may have average pore size sufficient to adsorb water and alcohols, for example 10 Å (Angstroms) or less, alternatively 5 Å or less, and alternatively 3 Å or less. Examples of adsorbents include zeolites such as chabasite, mordenite, and analcite; molecular sieves such as alkali metal alumino silicates, silica gel, silica-magnesia gel, activated carbon, activated alumina, calcium oxide, and combinations thereof.

Examples of commercially available moisture scavengers include dry molecular sieves, such as 3 Å (Angstrom) molecular sieves, which are commercially available from Grace Davidson under the trademark SYLOSIV® and from Zeochem of Louisville, Ky., U.S.A. under the trade name PURMOL, and 4 Å molecular sieves such as Doucil zeolite 4A available from Ineos Silicas of Warrington, England. Other useful molecular sieves include MOLSIV ADSORBENT TYPE 13X, 3A, 4A, and 5A, all of which are commercially available from UOP of Illinois, U.S.A.; SILIPORITE NK 30AP and 65xP from Atofina of Philadelphia, Pa., U.S.A.; and molecular sieves available from W.R. Grace of Maryland, U.S.A.

Alternatively, the moisture scavenger may bind the water and/or other by-products by chemical means. An amount of a silane crosslinker added to the composition (in addition to starting material f)) may function as a chemical moisture scavenger. Without wishing to be bound by theory, it is thought that the chemical moisture scavenger may be added to one or more parts of a multiple part composition to keep the composition free from water after the parts of the composition are mixed together. For example, alkoxysilanes suitable as moisture scavengers include vinyltrimethoxysilane, vinyltriethoxysilane, and combinations thereof.

The amount of moisture scavenger depends on the specific moisture scavenger selected. However, when the moisture scavenger is a chemical moisture scavenger, the amount may range from 0 to 5%, alternatively 0.1% to 0.5% based on combined weights of all starting materials in the primer composition.

The primer composition may optionally further comprise starting material k) a free radical cure accelerator. Starting material k) may comprise a quinone compound such as benzoquinone; or a compound containing at least one aromatic ring having one or more substituents selected from hydroxyl, ether, or both, with or without a peroxy-containing compound. The amount of free radical cure accelerator depends on the specific free radical cure accelerator selected and the other starting materials in the primer composition. However, the amount may range from 0 to 10%, alternatively 0.1 to 5%, alternatively 0.2 to 3% based on combined weights of all starting materials in the primer composition. Examples of free radical accelerators may be found, for example, in U.S. Patent Application Publication 2005/0137370 at paragraphs [0048] to [0065].

When selecting starting for the primer composition, there may be overlap between types of starting materials because certain starting materials described herein may have more than one function. For example, certain alkoxysilanes may be useful as crosslinkers, moisture scavengers, and/or adhesion promoters. Certain acyloxysilanes may be useful as starting material b) or starting material c). Each starting material added to the primer composition is distinct from the others. In one embodiment, starting material a) and starting material c) (when starting material c) is not a silicon containing compound) are added to the primer composition. Alternatively, starting material b) and/or starting material c) (when starting material c) is a silicon containing compound) may be added to the curable silicone composition (e.g., by mixing with the starting materials used to form the curable silicone composition and/or by coating on all or a portion of a surface of the curable silicone composition). Alternatively, the primer composition may comprise all of starting materials a), b) and c) and all of them are distinct from one another.

In step 1) of the method described above, the primer composition described above may be applied to the substrate by any convenient means, such as dip coating, spray coating, roll coating, brush coating, or wiping. The primer composition may have a thickness of 0.001 to 1,000 micrometers on a surface of the substrate, alternatively a thickness of 0.1 to 500 micrometers, alternatively 0.1 to 200 micrometers, and alternatively 0.1 to 100 micrometers.

The method may optionally further comprise drying the substrate before step 2, for example, when d) the solvent is present in the primer composition. Drying may be performed by any convenient means, such as exposing the substrate to ambient conditions for a time sufficient to allow all, or a portion, of the solvent to evaporate. Alternatively, drying may be performed by heating the substrate at a temperature sufficient to evaporate the solvent, e.g., 35° C. to 80° C. The method may further comprise contacting the primer composition or the primed surface with c) the organoborane liberating compound under conditions such that starting material c) reacts with starting material a) to liberate the organoboron free radical species. Generating the organoboron free radical species may be done just prior to contacting the primed surface with the curable silicone composition or during or after contacting the primed surface with the curable silicone composition. For example, in one embodiment, c) the organoborane liberating compound may be added to the primer composition before or during step 1). Alternatively, the primer composition may be a multiple part composition, such as a two part composition having a Part A and a Part B, where Part A comprises a) the organoboron compound capable of forming a free radical generating species, Part B) comprises c) the organoborane liberating compound. In this embodiment Part A) is applied to the substrate first, Part B is applied to the substrate subsequent to Part A. Drying may be performed after applying Part A, for example, if Part A contains solvent. Drying may be repeated after applying Part B, for example, if Part B contains solvent. Alternatively, c) the organoborane liberating compound may be added to the curable silicone composition (e.g., by mixing starting material c) with the curable silicone composition), and the organoborane liberating compound contacts the primed surface of the substrate during step 2). Alternatively, starting material c) the organoborane liberating compound may be present on a surface of the curable silicone composition (e.g., by coating the surface of the curable silicone composition with a solvent solution of starting material c), and thereafter allowing the surface to dry such that all or a portion of the solvent is removed), such that the surface of the curable silicone composition having the organoborane liberating compound thereon contacts the primed surface of the substrate during step 2). Alternatively, starting material c) may be applied onto the substrate prior to other parts of the primer composition.

After step 1) of the method described above (and after drying, if needed, e.g., to remove all or a portion of starting material d) the organic solvent, the curable silicone composition is contacted with the resulting primed surface of the substrate. Certain starting materials in the primer composition may be selected based on the cure system of the curable silicone composition selected. For example, a crosslinker having hydrolyzable groups may be selected for the primer composition when the curable silicone composition is a condensation reaction curable silicone composition. Alternatively, a crosslinker having silicon bonded hydrogen atoms may be selected when the curable silicone composition is a hydrosilylation reaction curable composition.

In one embodiment, the curable silicone composition is a condensation reaction curable silicone composition comprising:
(A) a condensation reaction catalyst, and
(B) a polyorganosiloxane having an average, per molecule, of two or more hydrolyzable substituents (such as hydrogen, hydroxyl groups, alkoxy groups, acyloxy groups such as acetoxy, oxime groups, and/or ketoxime groups). The composition may optionally further comprise one or more additional ingredients. The one or more additional ingredients are distinct from ingredients (A) and (B). Suitable additional ingredients are exemplified by (C) a crosslinker (e.g., any crosslinker that will react with the hydrolyzable substituents of starting material (B), such as hydrogen atoms, hydroxyl groups, alkoxy groups, acyloxy groups such as acetoxy, oxime groups, and/or ketoxime groups); (D) a drying agent; (E) an extender, a plasticizer, or a combination thereof; (F) a filler; (G) a filler treating agent; (H) a biocide; (J) a flame retardant; (K) a surface modifier such as an adhesion promoter; (L) a chain lengthener; (M) an endblocker; (N) a nonreactive binder; (O) an anti-aging additive; (P) a water release agent; (Q) a pigment; (R) a rheological additive; (S) a vehicle (such as a solvent and/or a diluent); (T) a tackifying agent; (U) a corrosion inhibitor; and a combination thereof. Alternatively, the curable silicone composition may be curable to form a curable silicone adhesive. In this embodiment, the curable silicone composition may comprise (A) the condensation reaction catalyst, (B) the polyorganosiloxane having an average, per molecule, of two or more hydrolyzable substituents, (C) the crosslinker, (F) the filler, (G) the filler treating agent, and (k) an adhesion promoter. Examples of suitable condensation reaction catalysts include tin compounds and titanium compounds. Examples of suitable ingredients (B) to (U), as described above, may be found in U.S. Pat. No. 9,469,799. Condensation reaction curable silicone adhesives are commercially available, for example, DOW CORNING® Q3-3363 Adhesive, from Dow Corning Corporation, a wholly owned subsidiary of The Dow Chemical Company, of Midland, Mich., U.S.A.

Alternatively, the curable silicone composition may be a hydrosilylation reaction curable composition comprising:
(A') a hydrosilylation reaction catalyst,
(B') a polyorganosiloxane having an average, per molecule, of two or more aliphatically unsaturated groups capable of undergoing hydrosilylation reaction, and
optionally (C') a crosslinker having an average, per molecule of two or more silicon bonded hydrogen atoms (which is added when B' does not contain sufficient silicon bonded hydrogen atoms). The hydrosilylation curable silicone composition may optionally further comprise one or more additional ingredients, which are distinct from ingredient (A'), ingredient (B'), and ingredient (C') described above. Suitable additional ingredients are exemplified by (D') a spacer; (E') an extender, a plasticizer, or a combination thereof; (F') a filler; (G') a filler treating agent; (H') a biocide; (I') a stabilizer, (J') a flame retardant; (K') a surface modifier; (L') a chain lengthener; (M') an endblocker; (N') a flux agent; (O') an anti-aging additive; (P') a pigment; (Q') an acid acceptor (R') a rheological additive; (S') a vehicle; (T') a surfactant; (U') a corrosion inhibitor; and a combination thereof. Examples of suitable hydrosilylation reaction catalyst include a metal selected from platinum, rhodium, ruthenium, palladium, osmium, and iridium; a compound of such a metal, and complexes of the metal compounds with low molecular weight organopolysiloxanes or platinum compounds microencapsulated in a matrix or core/shell type structure. Examples of suitable ingredients (B) to (U), as described above, may be found in U.S. Pat. No. 9,480,977. Suitable hydrosilylation reaction curable silicone adhesive compositions are commercially available, such as DOW CORNING® 3-6265 HP adhesive, also available from Dow Corning Corporation. Alternatively, the curable silicone composition may be curable by (i) condensation reaction, (ii) hydrosilylation reaction, (iii) free radical polymerization, (iv) epoxy ring opening polymerization, (v) thiol-ene addition, (vi) silacyclobutane ring opening reaction, or a combination of two or more of (i), (ii), (iii), (iv), (v), and (vi).

The method described above further comprises curing the curable silicone composition during and/or after step 2). Curing the curable silicone composition forms the cured silicone. The cured silicone may be a coating adhered to the substrate through the primer. Alternatively, the cured silicone may be an adhesive for adhering substrates together. The curable silicone composition may be cured by any convenient means. For example, condensation reaction curable silicone compositions may cure at room temperature of 25° C. or higher by exposure to atmospheric moisture, e.g., condensation reaction cure for the condensation reaction curable silicone composition described above. Alternatively, the curable silicone composition may cure by hydrosilylation reaction and cure may be facilitated by heating. The method may optionally further comprise a post curing step for the curable silicone composition, wherein the cured silicone is heated, e.g., to further crosslink the cured silicone and/or remove volatiles such as excess solvent, at a temperature of 150° C. or less, alternatively 125° C. or less, the exact temperature being selected such that the post curing temperature does not damage the substrate.

Low surface energy plastics such as polyethylene (PE), polypropylene (PP), polytetrafluoroethylene (PTFE), polyethylene terephthalate (PET), polybutylene terephthalate (PBT), polyamide (PA), polystyrene (PS), and copolymers thereof may be materials of construction for use as a substrate in the method described above. Other plastics suitable for the substrate material of construction include acrylonitrile-butadiene-styrene copolymer (ABS), polyvinyl chloride (PVC), polycarbonate (PC), epoxies, polyimides (PI), poly(phenyleneoxide), polyphthalamides, polymethylmethacrylate (PMMA), and combinations thereof may also be used.

FIG. 1 shows a cross section of a composite 100 prepared as described herein. The composite 100 includes a first substrate 101 having a first primer 102 on a first surface of the first substrate 101. A cured silicone adhesive 103 is adhered to the first substrate 101 through the primer 102. The composite 100 further includes a second substrate 105 adhered to the cured silicone adhesive 103 via a second primer 104 on a second surface of the second substrate 105. The first primer 102 and the second primer 104 may be the same or different. The first substrate 101 and the second substrate 105 may be the same or different. The first primer 102 and the second primer 104 are prepared using the primer composition in the method described above.

EXAMPLES

These examples are intended to illustrate some embodiments of the invention and should not be interpreted as limiting the scope of the invention set forth in the claims. The following starting materials were used in the examples.

TABLE 1

Starting Materials

| Abbreviation | Starting Material Details |
|---|---|
| MMA | e) Methyl Methacrylate |
| Z-6030 | b) Methacryloxypropyltrimethoxysilane |
| Hexane | d) Reagent grade hexane |
| TnBB | Tri-n-butyl borane |
| PMMA | e) Polymethylmethacrylate, Mn = 75,000 |
| Acetone | Reagent grade acetone |
| DP 8005 | Alkylborane catalyzed two part room temperature curable adhesive (not silicone), manufactured by 3M. |
| Q3-3636 | A Dow Corning commercially available adhesive based on silanol condensation chemistry catalyzed by a tin catalyst. It comes as a separate base and a separate catalyst and they are to be mixed in a 10:1 ratio before use. (Curable silicone adhesive) |
| IPA | Isopropyl Alcohol, reagent grade |
| PP | Polypropylene molded into 3X25.4X100 mm strips. (Substrate) |
| Acetic acid | e) Reagent grade acetic acid |
| IPDI | e) Isophorone Diisocyanate |
| MOPA | 3-methoxypropyl amine |
| TnBB-MOPA | a) TnBB-MOPA complex, solventless, containing 3.6 wt. % boron |

Example 1

Primer compositions were prepared by manually mixing starting materials in a glass container. Where PMMA was used in the primer composition, the PMMA was first dissolved in MMA before mixing with the other starting materials. Primer compositions are shown below in Table 2.

TABLE 2

Primer Compositions

| Ref. | c) MMA | d) Z-6030 | b) Hexane | a) TnBB-MOPA | e) IPDI | c) PMMA | Acetone | e) Acetic Acid |
|---|---|---|---|---|---|---|---|---|
| 1 | 0.8 | 0.2 | 9 | 0.042 | 0.06 | 0 | 0 | 0 |
| 2 | 0.5 | 0.5 | 0.11 | 0.042 | 0.06 | 0 | 0 | 0 |
| 3 | 0.4 | 0.5 | 0 | 0.06 | 0 | 0.1 | 9 | 0.046 |
| 4 | 0.4 | 0.5 | 3 | 0.042 | 0 | 0.1 | 6 | 0.032 |

Example 2

PP strips were cleaned with IPA, dried at room temperature in air, and then the primer composition was wiped onto the section to be adhered. The resulting primed substrates were left in air at room temperature for two hours before assembling lap shear samples.

On the unprimed side of the PP strip in the area opposite to the primed area, a distance half an inch away from the end was marked. Dow Corning adhesive Q3-3636 was applied to the other side on the primed area. 0.25 mm sized glass beads were sprinkled onto the adhesive. Another PP strip was placed on the adhesive to overlap the marked area, and the resulting assembly was clamped with spring clamp applying 50 lb. of force. The squeezed out excess adhesive was cleaned off, and the assembled samples were left in a ventilated hood to cure for 60 or 50 hours.

The resulting composites were then tested for lap shear adhesion strength. The composites were loaded onto the clamps of a MTS Alliance RT/5 testing frame using a 2000 N load cell. The testing speed was 25.4 mm/min. The peak load was recorded and divided by the overlapping area of the composites to calculate the adhesion strength. The tested composites were examined visually to determine the mode of failure, cohesive or adhesive.

Example 3

Two part primer compositions were prepared by mixing the starting materials in Part A and the starting materials in Part B. The starting materials are shown below in tables 3 and 4. Part A of each two part primer composition was applied onto a PP substrate prepared as described above in example 2. After 15 minutes, Part B of the primer composition was applied onto the PP substrate. The resulting samples were used to prepare composites, as described above in example 2. These composites were tested for lap shear adhesion strength as described above for example 2. The results are shown below in table 5.

TABLE 3

Two Part Primer Composition Sample 5

| Ref. | c) MMA | d) Z-6030 | b) Hexane | a) TnBB-MOPA | e) IPDI | PMMA | Acetone |
|---|---|---|---|---|---|---|---|
| 5A | 0 | 0 | 9.5 | 0.5 | 0 | 0 | 0 |
| 5B | 0.56 | 0.3 | 3 | 0 | 0.06 | 0.14 | 6 |

TABLE 4

Two Part Primer Composition Sample 6

| Ref. | d) Z-6030 | b) Hexane | DP 8005 Part A | DP 8005 Part B | Acetone |
|---|---|---|---|---|---|
| 6A | 0.3 | 4.5 | 0.7 | 0 | 4.5 |
| 6B | 0.06 | 0.6 | 0 | 0.14 | 1.2 |

TABLE 5

Lap Shear Adhesion Test Results and Failure Mode

| Sample Code | Boron Content, ppm in Primer | Primer Curing | Adhesive Curing | Lap Shear Strength, psi | Comment |
|---|---|---|---|---|---|
| Control | 0 | None | RT/60 h | 52.1 ± 4.2 | 0% CF, no primer |
| 1 | 1350 | RT/2 h | RT/50 h | 93.7 ± 17.1 | 0-2% CF |
| 2 | 1350 | RT/2 h | RT/50 h | 74.1 ± 7.0 | 0% CF |
| 3 | 1350 | RT/2 h | RT/50 h | 62.1 ± 5.2 | 0% CF |
| 4 | 1350 | RT/2 h | RT/50 h | 64.3 ± 2.3 | 0% CF |
| 5 | 1800 in 1st layer, 0 in 2nd layer | RT/2 h | RT/60 h | 99.8 ± 4.2 | 0% CF |
| 6 | Unknown | RT/2 h | RT/60 h | 65.3 ± 5.2 | 10-50% CF |

A control sample was tested as described above for example 2, except no primer composition was used.

INDUSTRIAL APPLICABILITY

The method described herein provides a novel approach to achieve strong adhesion of silicone to low energy plastics but with little compromise on silicone advantages. This approach formulates a surface primer to be applied onto the substrates, concentrating the high organic content composition in the very thin interface to minimize the total organic inclusion, while utilizing free radical generated by alkylborane to activate the substrate, and including silane species capable of free radical polymerization and another reaction with silicone to bridge between the substrate and the silicone. The examples show that a condensation reaction curable silicone can achieve strong adhesion to low energy plastics.

These examples further show that a primer composition comprising:
a) a tri-n-butyl borane—3-methoxypropyl amine complex,
b) a (meth)acryloxyalkyl, trialkoxysilane
c) an acid capable of reacting with starting material a) to liberate the free radical generating species,
d) an organic solvent; and
e) methyl(meth)acrylate can provide strong adhesion of a condensation reaction cured silicone to low energy plastics such as polypropylene. The primer composition may optionally further comprise polymethyl(meth)acrylate. The primer composition may be a multiple part composition comprising a Part A and a Part B; Part A comprises a) the tri-n-butyl borane—3-methoxypropyl amine complex and d) the organic solvent; Part B comprises b) the (meth)acryloxyalkyl, trialkoxysilane, c) the acid, and d) the organic solvent; and e) the methyl(meth)acrylate is present in one or both of Part A and Part B.

All amounts, ratios, and percentages are by weight unless otherwise indicated. The articles 'a', 'an', and 'the' each refer to one or more, unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means a saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl); hexyl, heptyl, octyl, nonyl, and decyl, as well as branched saturated monovalent hydrocarbon groups of 6 or more carbon atoms.

"Alkenyl" means a monovalent hydrocarbon group containing a double bond. Alkenyl groups are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms.

"Alkynyl" means a monovalent hydrocarbon group containing a triple bond. Alkynyl groups are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 18 carbon atoms, alternatively 10 to 14 carbon atoms, and alternatively 12 to 14 carbon atoms.

"Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Carbocycle" and "carbocyclic" each mean a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 18 carbon atoms, alternatively 7 to 14 carbon atoms, and alternatively 9 to 10 carbon atoms. Carbocycles may be saturated or partially unsaturated.

"Cycloalkyl" means saturated carbocycle. Monocyclic cycloalkyl groups are exemplified by cyclobutyl, cyclopentyl, and cyclohexyl.

Collectively, the term "monovalent hydrocarbon group" includes alkyl, alkenyl, aryl, aralkyl, and carbocyclic groups, as defined above.

"Divalent hydrocarbon group" includes alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene; and alkaralkylene groups such as:

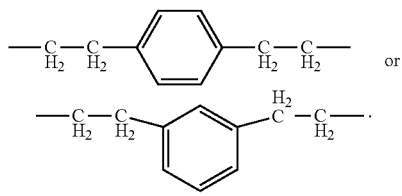

Alternatively, each divalent hydrocarbon group may be ethylene, propylene, butylene or hexylene. Alternatively, each divalent hydrocarbon group may be ethylene or propylene.

"Halogenated hydrocarbon" means a hydrocarbon group as defined above, but where one or more hydrogen atoms bonded to a carbon atom have been formally replaced with a halogen atom. For example, monovalent halogenated hydrocarbon groups can be any one of alkyl, alkenyl, aryl, aralkyl, and carbocyclic groups in which one or more hydrogen atoms bonded to a carbon atom have been replaced with a halogen atom. Monovalent halogenated hydrocarbon groups include haloalkyl groups, halogenated carbocyclic groups, and haloalkenyl groups. Halogenated alkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Halogenated alkenyl groups include chloro allyl.

The invention claimed is:

1. A method for adhering a cured silicone to a substrate, where the method comprises:
   1) applying a primer composition to a surface of a substrate, where the primer composition comprises
      a) an organoboron compound capable of forming a free radical generating species, and
   2) contacting a curable silicone composition with the surface of the substrate, where the primer composition and/or the curable silicone composition further comprise at least one of
      b) an organosilicon compound having, per molecule, at least one free radical reactive group and at least one other reactive group, and/or
      c) an organoborane liberating compound capable of reacting with starting material a) to liberate the free radical generating species, with the proviso that starting material c) is used in the method when either starting material b) is absent or starting material b) does not contain a group capable of reacting with starting material a) to liberate the free radical generating species.

2. The method of claim 1, where the primer composition further comprises one or more additional starting materials selected from the group consisting of: d) an organic solvent; e) a free radical polymerizable monomer, oligomer, macromonomer, or polymer; f) a crosslinker; g) an adhesion promoter; h) a wetting agent; i) a corrosion inhibitor; j) a moisture scavenger; and k) a free radical cure accelerator.

3. The method of claim 2, where the primer composition is a two part composition having a Part A) and a Part B), where Part A) comprises starting materials a) and d); and Part B) comprises b), c), d), and e).

4. The method of claim 2, where the primer composition is a two part composition having a Part A) and a Part B), where Part A) comprises starting materials a), b), and d); and Part B) comprises starting materials b), c), and d).

5. The method of claim 2, where starting material d) the solvent is present, and starting material d) is selected from the group consisting of (i) alkanes, (ii) ethers, (iii) esters, (iv) ketones, and (v) aromatic hydrocarbons, or a combination of two or more of (i), (ii), (iii), (iv), and (v).

6. The method of claim 2, where starting material e) is present and starting material e) is a (meth)acrylate monomer selected from the group consisting of: (i) methylacrylate, (ii) butylacrylate, (iii) 2-ethylhexylacrylate, (iv) isobornylacrylate, (v) terahydrofurfuryl acrylate, (vi) cyclohexylmethylacrylate, (vii) methylmethacrylate, (viii) butylmethacrylate, (ix) 2-ethylhexylmethacrylate, (x) isobornylmethacrylate, (xi) terahydrofurfuryl methacrylate, (xii) cyclohexylmethylmethacrylate, and (xiii) amino-methacrylates such as dimethylaminoethyl methacrylate, (xiv) tert-butylmethacrylate, (xv) ethylacrylate, (xvi) hydroxyethylmethacrylate, (xvii) glycidyl methacrylate, (xviii) n-methacrylamide, and (xix) mixtures of two or more of (i), (ii), (iii), (iv), (v), (vi), (vii), (viii), (ix), (x), (xi), (xii), (xiii), (xiv), (xv), (xvi), (xvii), and (xviii).

7. The method of claim 1, further comprising: 3) curing the curable silicone composition to form a cured silicone.

8. The method of claim 7, where the curable silicone composition is curable by (i) condensation reaction, (ii) hydrosilylation reaction, (iii) free radical polymerization, (iv) epoxy ring opening polymerization, (v) thiol-ene addition, (vi) silacyclobutane ring opening reaction, or a combination of two or more of (i), (ii), (iii), (iv), (v), and (vi).

9. The method of claim 7, where the cured silicone is an adhesive, coating, or sealant.

10. The method of claim 7, where the cured silicone is an adhesive, and the method further comprises: contacting a second substrate with the curable silicone composition, thereby forming a composite.

11. The method of claim 1, where the curable silicone composition further comprises starting material b), and starting material b) is present in, and/or on a surface of, the curable silicone composition.

12. The method of claim 1, where a) the organoboron compound is selected from the group consisting of: i) an organoborane—organonitrogen compound complex, ii) an organoborate containing at least one B—C bond, and iii) both i) the organoborane—organonitrogen compound complex and ii) the organoborate containing at least one B—C bond.

13. The method of claim 1, where starting material b), the organosilicon compound having, per molecule, at least one hydrolyzable group and at least one free radical reactive group, is present and starting material b) is a silane of formula $R^1{}_m R_n SiX_{(4-m-n)}$, where each R is independently a monovalent hydrocarbon group of 1 to 18 carbon atoms, each $R^1$ is a methacryl-functional alkyl group or an acryl-functional alkyl group, each X independently represents a hydrolyzable group selected from an acetamido group, an acyloxy group such as acetoxy, an alkoxy group, an amido group, an amino group, an aminoxy group, an oximo group, a ketoximo group, and a methylacetamido group, subscript m is 1 to 2, subscript n is 0 to 2, and a quantity (m+n) is 2 to 3.

14. The method of any one of claims 1, where starting material b), the organosilicon compound having, per molecule, at least one hydrolyzable group and at least one free radical reactive group, is present and starting material b) is a polyorganosiloxane of unit formula: $(X_cR_{3-c}SiO_{1/2})_o(R^1R_2SiO_{1/2})_p(R_2SiO_{2/2})_q(RXSiO_{2/2})_r(R^1RSiO_{2/2})_s(R^1SiO_{3/2})_w(RSiO_{3/2})_t(SiO_{4/2})_u$, where each R is independently a monovalent hydrocarbon group of 1 to 18 carbon atoms, each $R^1$ is a methacryl-functional alkyl group or an acryl-functional alkyl group, each X independently represents a hydrolyzable group selected from an acetamido group, an acyloxy group such as acetoxy, an alkoxy group, an amido group, an amino group, an aminoxy group, an oximo group, a ketoximo group, and a methylacetamido group, subscript o≥0, subscript p≥0, subscript q≥0, subscript r≥0, subscript s≥0, subscript w≥0, subscript t≥0, and subscript u≥0, with the provisos that a quantity (o+r)≥1, a quantity (p+s+w)≥1, and a quantity (o+p+q+r+s+w+t+u)>2.

15. The method of claim 1, where starting material c) the organoborane liberating compound is present, and starting material c) is selected from the group consisting of: i) an acid, ii) an aldehyde, iii) an isocyanate, iv) an epoxide, v) an acid chloride, vi) an anhydride, vii) an acyloxysilane, viii) an acyloxysiloxane, ix) a halosilane, x) a halosiloxane, xi) a carboxylic acid functional silane, xii) a carboxylic acid functional siloxane, xiii) an anhydride functional silane, xiv) an anhydride functional siloxane, xv) an epoxy functional silane, xvi) an epoxy functional siloxane, xvii) a sulphonyl chloride, and a combination of two or more of i), ii), iii), iv), v), vi), vii), viii), ix), x), xi), xii), xiii), xiv), xv), xvi), and xvii).

16. A method for preparing a composite comprising:
1) applying a primer composition to a surface of a substrate, where the primer composition comprises
   a) an organoboron compound capable of forming a free radical generating species, and
2) contacting a curable silicone composition with the surface of the substrate, where the primer composition and/or the curable silicone composition further comprise at least one of
   b) an organosilicon compound having, per molecule, at least one free radical reactive group and at least one other reactive group, and/or
   c) an organoborane liberating compound capable of reacting with starting material a) to liberate the free radical generating species, with the proviso that starting material c) is used in the method when either starting material b) is absent or starting material b) does not contain a group capable of reacting with starting material a) to liberate the free radical generating species,
3) curing the curable silicone composition to form a cured silicone; wherein the composite further comprises
   a second substrate having a second surface adhered to the cured silicone opposite the surface of the substrate; and
   optionally a second primer on the second surface of the second substrate contacting the cured silicone.

17. The method of claim 16, where the substrate and the second substrate have different materials of construction.

18. The method of claim 16, where the second primer is present, and the second primer differs from a primer formed after step 1) and step 2).

* * * * *